Dec. 2, 1930.  H. R. COOK  1,783,408

UNIVERSAL CLAMP FOR OUTLET BOXES

Filed Sept. 11, 1926

Inventor
Herbert Ray Cook
By Chindahl Parker Karlen
Attys.

Patented Dec. 2, 1930

1,783,408

UNITED STATES PATENT OFFICE

HERBERT RAY COOK, OF CHICAGO, ILLINOIS, ASSIGNOR TO JEFFERSON ELECTRIC COMPANY, OF CHICAGO, ILLINOIS, A CORPORATION OF ILLINOIS

UNIVERSAL CLAMP FOR OUTLET BOXES

Application filed September 11, 1926. Serial No. 134,799.

This invention pertains generally to outlet boxes and in particular relates to a universal means for securing an electric cable in an outlet box.

It has been customary in this art to provide a separate means for clamping a cable in an outlet box for each set of knockout holes in the box. In such cases a clamp must either be provided for each set of knockout holes, or one clamp is furnished with the box which clamp must be changed to correspond with the proposed use of a certain set of knockouts. In one case the number of parts necessary, and consequently the cost of the assembly, is excessive, and in the other case time and labor are wasted in the re-positioning and adjustment of the clamp. It is therefore an object of this invention to provide a universal clamp for an outlet box which clamp is capable of securing a cable entering the box through any one of a plurality of pairs of knockout holes.

Other objects and advantages will become apparent from the following description and the accompanying drawings in which:

Figures 1 and 2 are fragmentary plan views of an outlet box showing the improved clamp acting upon two types of cable which enter the box from one side and the bottom respectively.

Figs. 3 and 4 are fragmentary sectional views taken on the line 3—3 of Fig. 1 and line 4—4 of Fig. 2 respectively.

Figure 1:
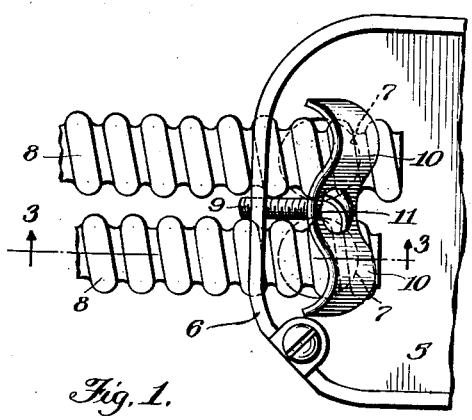

I have chosen, merely for the purpose of illustrating this invention, an outlet box which embodies the customary features of these appliances, including a base 5 and side walls 6 formed integral therewith. A plurality of knockout holes 7 positioned in the side walls and the base provide optional inlets for cables or conduits 8. The clamping means, by which the conduit is held firmly in the outlet box, comprises a screw 9 and a suitable yoke member 10. A central opening 11 in the yoke provides a passage therethrough for the screw 9 and is of greater diameter than the screw to permit a free swinging or rotational and pivotal movement of the yoke relative to the screw so that the yoke can with equal facility engage a conduit entering the outlet box through the knockouts in either the base or the side walls. The yoke 10 may also conform to any irregularity on the surface of the conduit as in the case of an armored conduit. The screw and yoke are held together by any preferred means as by deformation of the screw to provide lugs 12 thereon which allows the screw only a limited longitudinal travel through the opening 11. The yoke is thus permanently associated with the screw and will follow the screw in its up and down movement in the box. This eliminates a disadvantage encountered when the screw and the yoke are not so connected, in that the yoke need not be separately adjusted when inserting a conduit into the box. Preferably the under surface of the screw head is annularly beveled, as at 13, to provide a bearing surface thereon for contact with the surface of the yoke at all points of the universal movement thereof. A screw threaded opening in the outlet box at the intersection of the base 5 and the wall 6 is adapted to receive the screw 9. Thus, by engaging the screw with the box at the point of intersection, the clamp will be caused to extend inwardly of the box at an angle of substantially 45° with the base or the walls.

Figure 3:
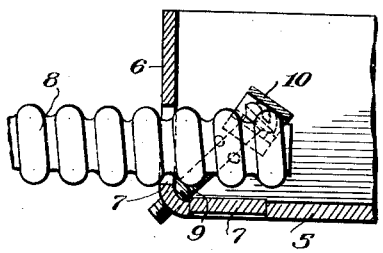

The location of the knockout holes 7 is shown clearly in Figs. 1 and 3. Each pair of holes is located in the base 5 or the walls 6 of the box at points relatively near the intersection of the base and the walls. Furthermore, each pair of holes is in alinement with the adjoining pair so that, were the walls and the base of the box in the same plane, each two pairs of holes would be substantially at the corners of a square figure. The opening in the intersection which receives the screw 9 occupies a position which would be at the intersection of the diagonals of the above mentioned square.

Figure 2:
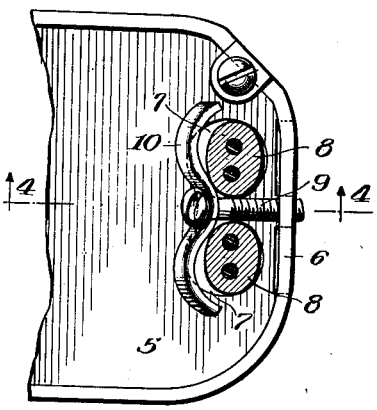
Figure 4:
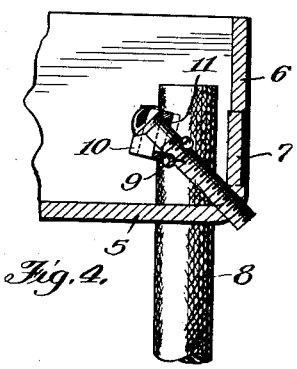
Figure 5:
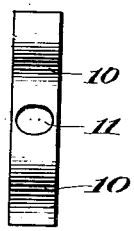
Figs. 5 and 6 are a plan view and a side elevation respectively of the yoke.
Figure 6:
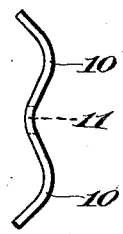
Figure 7:
Fig. 7 is a central section of the assembled yoke and bolt.

In this manner a clamp has been provided which angles into the outlet box and which, due to its position with respect to that of the knockout holes, will engage a conduit entering the box through the walls 6 or the base 5 to clamp said conduit between the yoke 10 and the outlet box. Figs. 1 and 3 show clearly the action of the clamp upon an armoured conduit entering the box through the walls 6, while Figs. 2 and 4 depict the clamp acting upon an ordinary insulated conduit entering the box through the base 5. As the screw 9 is tightened the conduit or cable projecting through the knockout holes in one wall of the box will be bent toward and clamped firmly against the other wall of the box.

Although the invention is susceptible of various modifications and alternative constructions, I have shown and herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. An outlet box comprising, in combination, a base and a side wall secured thereto, said base and wall each having therein a pair of knockout holes, and a clamp mounted in said outlet box at the intersection of said base and wall, said clamp occupying a position in said box substantially bisecting the angle of intersection of said base and wall whereby said clamp is adapted to engage with equal facility a conduit entering either of said pairs of knockout holes.

2. An outlet box having, in combination, a base and a side wall each having therein a plurality of knockout holes, and a clamp for securing a conduit entering the box through the knockout holes in either said base or side wall, said clamp comprising a screw engaging said box and projecting inwardly thereof at an angle to said base and side walls, and means loosely mounted on said screw adapted to conform swingingly and pivotally to the surface of a conduit entering either of said knockout holes.

3. An outlet box having, in combination, a base and a side wall, each having therein a pair of knock-out holes, and means mounted in said box for clamping a pair of cables extending into said box through either of said pairs of knock-out holes, said clamping means comprising a screw threaded into said box substantially at the intersection of said base and side wall and occupying a position substantially bisecting the angle between said base and side wall, and a cable-engaging device having a central aperture larger than said screw through which aperture said screw passes loosely leaving the head of said screw exposed within said box, said clamping device further having portions adjacent to its ends spaced apart a distance substantially corresponding to the spacing of either pair of knock-out holes, said portions being shaped to engage or partially embrace the two cables extending through one of said pairs of knock-out holes, and said clamping device being drawn into tight clamping engagement with said cables by turning said screw.

4. An outlet box having, in combination, a base and a side wall, each having a pair of adjacent knock-out holes therein, and a clamping device mounted in said box for securing a pair of cables extending through either of said pairs of holes, said clamping device comprising a screw occupying a diagonal position in the box with relation to said base and side wall, and a cable-engaging member having end portions to engage a pair of cables and having a central aperture through which said screw extends, said member being movable into clamping engagement with said cables by rotation of said screw.

5. An outlet box having, in combination, a base wall and an intersecting side wall, each of said walls having a pair of knock-out holes formed therein adjacent their intersection, clamping means permanently positioned within said box, said means comprising in apertured substantially rigid sheet metal member extending substantially parallel to said intersection and transversely of said pairs of knock-out holes and having portions fashioned to conform roughly to the cross-section of conduits to be clamped thereby, and a headed screw extending through the aperture in said member into engagement with said box at an angle to the walls thereof and operable to apply clamping pressure to said member to clamp a pair of conduits extending through either of said pairs of holes.

6. An outlet box having, in combination, a base and a wall secured thereto, said base and wall each having a knock-out hole therein, and a clamp comprising a screw engaging said outlet box, and a yoke carried by said screw in substantially equi-distant relationship to both of said knock-out holes, said yoke having loose rotational and pivotal movement relative to said screw to permit said yoke to adapt itself for engagement with the surface of a conduit entering either of said knock-out holes.

7. An outlet box comprising, in combination, a base and a wall secured thereto, said base and wall each having a knock-out hole therein, and a clamp for securing a conduit entering the box through either of said knock-out holes, said clamp comprising a conduit engaging means, and a screw supporting said means in substantially equidistant relation to each of said knock-out holes, said screw having a threaded engagement with said box to move said engaging means toward and away from the box in a plane which is substantially equi-distant from each of said knock-out holes.

8. The combination with an outlet box having walls at right angles to each other and adapted to receive a conduit through either of said walls, of clamping means comprising a single adjustable anchoring device engaging the box and a pressure member loosely positioned on said device and operable thereby to clamp a conduit entering through either of said walls against the other of said walls.

9. The combination with an outlet box having adjoining base and side walls disposed at an angle relatively to each other, said base and side walls each having a knock-out hole therein closely adjacent to the intersection of said walls, an adjustable anchor engaging said walls at their point of joining and extending into said box so as to substantially bisect the angle between said walls, and a yoke shiftably mounted on said anchor arranged to permit a conduit to be inserted into the knockout hole in either of said walls and operable by adjustment of said anchor to clamp such a conduit against the other of said walls.

10. In combination with an outlet box having walls provided with knockout holes, a clamping member shiftably positioned in said box so as to permit a conduit to be inserted into said box through the knockout hole in either of two adjoining walls, and means operable to engage said clamping member with such a conduit to clamp the conduit against the other of said adjoining walls, said clamping member being arranged to prevent lateral displacement of a conduit clamped thereby.

In testimony whereof, I have hereunto affixed my signature.

HERBERT RAY COOK.